US009479392B2

(12) United States Patent
Anderson et al.

(10) Patent No.: US 9,479,392 B2
(45) Date of Patent: Oct. 25, 2016

(54) PERSONAL COMMUNICATION DRONE

(71) Applicant: Intel Corporation, Santa Clara, CA (US)

(72) Inventors: Glen J. Anderson, Beaverton, OR (US); Kathy Yuen, Portland, OR (US); Jamie Sherman, Portland, OR (US); Lenitra M. Durham, Beaverton, OR (US); Richard Beckwith, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 14/592,494

(22) Filed: Jan. 8, 2015

(65) Prior Publication Data
US 2016/0204978 A1  Jul. 14, 2016

(51) Int. Cl.
| | |
|---|---|
| *H04W 4/00* | (2009.01) |
| *H04L 12/24* | (2006.01) |
| *B64C 39/02* | (2006.01) |
| *H04B 7/185* | (2006.01) |
| *H04L 12/26* | (2006.01) |
| *H04W 4/02* | (2009.01) |
| *H04W 76/04* | (2009.01) |

(52) U.S. Cl.
CPC ......... *H04L 41/0668* (2013.01); *B64C 39/024* (2013.01); *H04B 7/18506* (2013.01); *H04L 41/0816* (2013.01); *H04L 43/0817* (2013.01); *H04W 4/02* (2013.01); *H04W 76/045* (2013.01); *B64C 2201/122* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,735,630 | B1 * | 5/2004 | Gelvin | B60R 25/1004 706/33 |
| 2015/0236778 | A1 * | 8/2015 | Jalali | H04W 84/06 370/316 |
| 2015/0266577 | A1 * | 9/2015 | Jones | G05D 1/102 701/3 |
| 2015/0382169 | A1 * | 12/2015 | Burba | H04W 4/008 455/11.1 |
| 2016/0073271 | A1 * | 3/2016 | Schultz | H04W 16/26 455/404.1 |
| 2016/0163205 | A1 * | 6/2016 | Jenkins | G08G 5/0069 701/3 |

OTHER PUBLICATIONS

Valente et al, An Air-Ground Wireless Sensor Network for Crop Monitoring, downloadable at www.mdpi.com/journal/sensors, 221 pages, 2011.*

* cited by examiner

*Primary Examiner* — Frank Duong
(74) *Attorney, Agent, or Firm* — Schwegman Lundberg & Woessner, P.A.

(57) ABSTRACT

A system of using a drone for network connectivity, the system may comprise: a connectivity module to: detect an error associated with network traffic on a network connection utilized by a user device; query a connection datastore to retrieve at least one access point location that at least one device of the user has utilized within a predetermined period; a drone coordination module to: transmit configuration settings to a drone, the configuration settings including the at least one access point location and a mode of operation for the drone; and route at least a portion of the network traffic of the user device to the drone for transmission according to the configuration settings.

25 Claims, 5 Drawing Sheets

PERSONAL COMMUNICATION DRONE

TECHNICAL FIELD

Embodiments described herein generally relate to drones and in particular, but not by way of limitation to a personal communication drone.

BACKGROUND

Drones, such as unmanned aerial vehicles (UAVs), are no longer restricted to being operated by military or government personnel. Increasingly, the drones are being operated by individuals or commercial entities. For example, a person may use a drone to inspect their farm for damage or a company may use a drone to inspect oil pipelines.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

The proliferation of a single person having multiple network-enabled devices has enabled users to access multiple types of networks; however, these devices become less valuable if a network connection cannot be maintained or ceases entirely. In various examples described herein a system is described to alleviate a bad or missing connection for a person's network-enabled device at a geographic location. For example, a person may utilize a personal drone—one associated with a user's devices—to transmit messages and receive data at another geographic location where a connection is stronger. Thus, the technical problem of a bad or missing network connection may be solved by using a personal drone. Other benefits of having a personal drone may be realized by analyzing the present disclosure.

Figure 1:
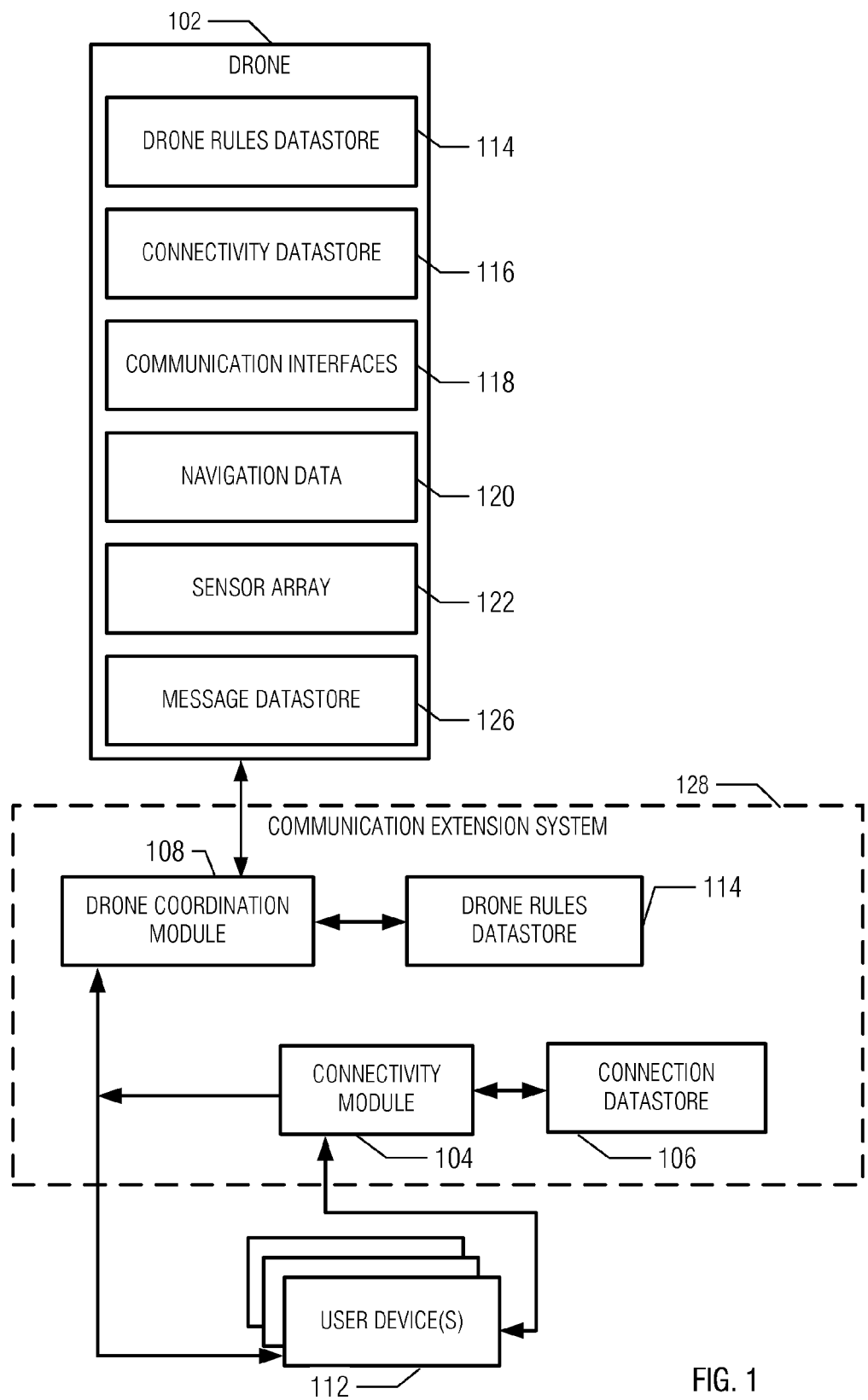
FIG. 1 illustrates a block diagram of a personal communication drone system, according to various examples.

FIG. 1 illustrates a block diagram of a personal communication drone system. FIG. 1 illustrates a drone 102, a connectivity module 104, a connection datastore 106, a drone coordination module 108, a drone rules datastore 114, and a user device 112. In an example, the connectivity module 104, connection datastore 106, drone coordination module 108, and the drone rules datastore 114 are part of a communication extension system 128. The drone 102 may include the drone rules datastore 114, connectivity datastore 116, communication interfaces 118, navigation data 120, sensor array 122, and a message datastore 126.

In various examples, the drone 102 may be an unmanned aerial vehicle (UAV), unmanned ground vehicle, or an unmanned marine vehicle. The drone may operate in a variety of modes such as autonomously, semi-autonomously, or manually. For example, an autonomous UAV may be programmed with a path using waypoints (e.g., latitude, longitude, elevation) that the UAV follows and the returns back to its origination point. Automatic object detection and avoidance may be used when a UAV is in an autonomous mode. A semi-autonomous UAV may be programmed to navigate to a specific spot and then wait for further instructions. Manual control may include a user using a remote control to control the UAV.

The drone 102 may utilize the navigation data 120 and sensor array 122 to navigate—autonomously or otherwise—to access point locations. For example, the sensor array 122 may include sensors such as temperature sensors, pressure sensors, electro-optical sensors, infrared sensors, depth cameras, camera arrays, microphone arrays, gyroscopes, accelerometers, proximity sensors, microphones, and magnetometers. The navigation data 120 may include data representing a geographic area including roads and their associated positioning coordinates (e.g., GPS or GLONASS). The navigation data 120 may include altitude data of the geographic area. The data 120 may also location data on man-made objects such as bridges, cell towers, etc.

In various examples, communication interfaces 118 may be used to communicate with the user device 112 and other sources over a network. Thus, the communication interface 118 may include receivers, transmitters, or transceivers for with a variety of network types and protocols. The drone 102 may communicate with the user device 112 or the communication extension system 128 using a first network type (e.g., 802.11) and operate with an access point (not shown) using a second network type (e.g., cellular network).

A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

In various examples, the drone rules datastore 114 may store a set of rules that govern how the drone 102 is to operate for a given set of conditions. The drones rules datastore 114—and other datastores described herein—may be a database (e.g., relational, non-relational, flat file, etc.) or other format (e.g., individual files, tables, etc.) that is stored on a machine-readable medium (e.g., hard disk, firmware, flash memory, FRPOM, etc.). For example, the drone rules datastore 114 may indicate that when the battery life left is insufficient to navigate to an access point, the drone 102 may return back to a user's location to recharge.

The drone rules datastore 114 may receive rules from the communication extension system 128. Further, as illustrated in FIG. 1, the rules on the drone 102 are also stored in the communication extension system 128. In an example, the rules on the drone 102 may be a subset of the rules stored in the communication extension system 128. The rules on the drone 102 may be updated periodically. For example, the drone rules datastore 114 on the drone 102 may receive updates from the communication extension system 128.

Figure 3:
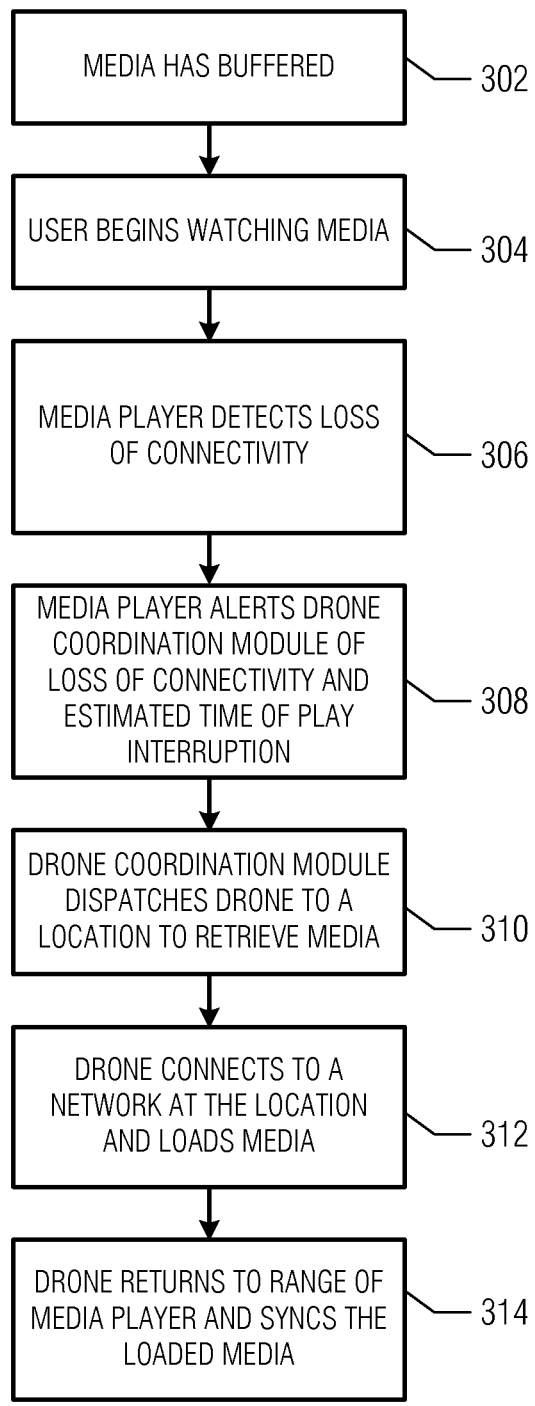
FIG. 3 is a flow chart illustrating a method to receive media data from a drone in a batch mode of operation.

In various examples, the drone rules datastore 114 includes rules for a variety of operational modes of the drone 102. Operational modes may include, but are not limited to, a relay mode, a batch mode, a forward mode, an emergency mode, and an institutional assistance mode. In an example, when the drone 102 operates in a relay mode, the drone 102 navigates to another user device to relay messages on behalf of a first user device. In an example, when the drone 102 operates in a batch mode, the drone 102 navigates to a wireless access point to deliver or receive data in a batch mode before returning to the location of the user device 112—an example of which is illustrated in FIG. 3.

In an example, when the drone 102 operates in an emergency mode, the drone 102 attempts to notify medical authorities of a possible health problem of a person. For example, a user may have a wearable device that transmits health data (e.g., heart rate, temperature) to the drone 102 periodically. The pieces of health data may be compared against safety thresholds to detect a potential health emergency that warrants the drone 102 notifying the medical authorities. Notifications may include push notification, broadcasts, e-mail, or an automated phone call.

In an example, when the drone 102 operates in an institutional assistance mode, control of the drone 102 may be handed off to local authorities. For example, the drone 102 may detect an audio alert—or receive a notification message—of an emergency. The drone 102 may then switch to an institutional mode and await commands from a predetermined device(s). In an example, in the institutional assistance mode, the drone 102 operates as an access point.

In various examples, the connectivity datastore 116 includes data on access points where an attempt may be made to establish a network connection. An access point may be for various types of networks or protocols, including, but not limited to: 802.11, WiMax, cellular, radio, and laser. Data for a particular access point may include the geographic location (e.g., GPS coordinates and altitude), the last time a network connection was made at the access point, the strength (e.g., upload/download rates), and the type of connections supported at the access point. The data in the connectivity datastore 116 may be periodically updated by the drone coordination module 108.

In an example, the data in the connectivity datastore 116 may be updated by the drone 102 as it navigates. For example, consider that the drone 102 is flying to a location of access point A and detects access point B. The connectivity datastore 116 may be updated to include an entry for access point B. Similarly, data for access point A may be updated when the drone 102 arrives at the location of access point A. For example, the signal strength may be updated.

In various examples, the message datastore 126 stores data on the message(s) being transmitted on behalf of the user device 112—including the message or network traffic itself. The message datastore 126 may also store data received for the user device 112. Additional data may be stored that is needed to operate on behalf of the user device 112 in certain circumstances. For example, consider the situation in which a user is requesting content that has digital rights (DRM) attached to the content. Credentials or other authentication data (e.g., tokens authorizing the playback of a media file such as video) may be stored in the message datastore 126 to allow the drone 102 to request and receive the DRM content.

In various examples, the components and datastores of the communication extension system 128 may be merged. For example, the connection datastore 106 and the drone rules datastore 114 may be a single datastore. Additionally, the drones rule datastore 114 is illustrated in two locations—in the drone 102 and the communication extension system 128. In various examples, two different drone rules datastore in these locations. For example, the drone rules datastore in the drone 102 may be a subset of the drone rules datastore in the communication extension system 128.

The locations of the components may likewise be separated by device or geographic location. In an example, the components of the communication extension system 128 are located on a router that is communicatively coupled to the user device 112. In various examples, the components of the communication extension system 128 are part of an application residing on the user device 112.

In various examples, the connectivity module 104 monitors network traffic from the user device 112. For example, the connectivity module 104 may monitor Quality of Service (QoS) metrics—such as throughput, dropped packets, latency, jitter, and out-of-order delivery—to gauge if the network traffic flowing over a network connection is adequate for the needs of the user. If the connectivity module 104 detects an error in the network connection, the connectivity module 104 may transmit a message to the drone coordination module 108 to utilize the drone 102 for network connectivity.

An error in a network connection may be the total loss of the network connection or a degraded network connection. For example, if a user is currently attempting to watch a video on the user device 112, the connectivity module 104 may detect that the bandwidth throughput is not enough to meet the needs of the video (e.g., the bitrate of the video exceeds the network connection's throughput). In another example, the throughout may drop to zero indicating the network connection is no longer available.

In various examples, the connectivity module 104 maintains the connection datastore 106. Entries in the connection datastore 106 may indicate access points where a network connection may be made by the drone 102. As with the connectivity datastore 116, the entries may store the geographic location (e.g., GPS coordinates and altitude) of the access point, the last time a network connection was made at the access point, the strength (e.g., upload/download rates) of the access point, and the type of connections supported at the access point.

In various examples, the connection datastore 106 is updated based on the connections the user device(s) has made. For example, throughout the day, the user device 112 may establish a network connection with multiple cell-towers and Wi-Fi routers. When a network connection is made, the user device 112 may store the device's current GPS coordinates (e.g., by accessing a GPS sensor on the user device 112), how the connection was made (e.g., Wi-Fi, cellular), and the strength of the connection.

Even if the user device 112 does not establish a connection with an access point, information may be gathered. For example, the user device 112 may detect numerous open Wi-Fi access points throughout the day. When such an access point is detected, the current geographical coordinates (e.g., GPS) of the user device may be stored and associated with the access point.

The connection datastore 106 may be updated based on the information gathered by the user device 112 in a number of ways. Furthermore, the connection datastore 106 may be updated by multiple user devices. For example, a user may own a smartphone, a tablet, a laptop computer, and a wearable device (e.g., smart watch). When any of these user devices connects or detects an access point, the connection datastore 106 may be updated using one or more of the techniques described below.

First, if the connection datastore 106 is stored on the user device 112—as may be the case if the communication extension system 128 exists as an application on the user device 112—the datastore may be updated as the access points are detected. Second, if the connection datastore 106 is located in a separate location, such as in a router at the user's residence, the connection datastore 106 may be updated when the user device 112 connects using an access point at the residence. In a third example, the user device 112 may transmit messages over a network to the communication extension system 128 with the access point information.

In various examples, the drone coordination module 108 is responsible for transmitting configuration settings (discussed further below) to the drone 102 when an error is detected in a network connection. For example, the drone coordination module 108 may receive a notification from the connectivity module 104, that a network connection being utilized by the user device 112 has an error. In an example, the error may be classified such as no connectivity or slow connectivity. Other error classifications may also be used.

In various, examples, an indication of the type of network traffic currently flowing, or attempting to flow, over the network connection may also be received. For example, the network traffic may be a message such as e-mail message or short message system (SMS) message. In an example, the network traffic is a video stream from a video service.

In various examples, in response to receiving the indication of the error, the drone coordination module 108 may present an option to the user to utilize the drone 102 to transmit/receive network traffic. Presentation may include transmitting the option to the user device 112 for display on a display device of the user device 112. In various examples, presenting may include playing an audio prompt with the option.

In various examples, in response to receiving an acknowledgment from the user that he or she wants to utilize the drone 102, the configuration settings for the drone 102 may be determined. The acknowledgment may be based on receiving input on the user device 112 including but not limited to touch input, voice input, and gesture input.

In various examples, the drone rules datastore 114 is queried to determine what configuration settings should be transmitted to the drone 102. Entries in the drone rules datastore 114 may be based on one or more of the classification of the error type, the type of network traffic, and the locations of access points in the connection datastore 106. The drone rules datastore 114 may also include entries on the behavior of the drone coordination module 108. The table below includes examples conditions and rules that may be stored in the drone rules datastore 114. As seen, the configuration settings for the drone 102 may indicate a mode of operation and navigation behavior for the drone 102.

| Conditions | Action |
| --- | --- |
| 1. No connectivity in range of user device, user presses send on a message. | System presents message to user to ask whether drone should be used to send message. |
| 2. #1 has been met; GPS coordinates or previous connections have been loaded in drone; messages have been loaded in drone; no attempts have been made by drone to connect; the nearest location of connectivity by a user device was at GPS location N, N using cellular; location N, N is out of range of the user's other devices | The drone flies to location N, N and attempts cellular connectivity to deliver message in a batch mode |
| 3. #1 has been met; GPS coordinates or previous connections have been loaded in drone; messages have been loaded in drone; no attempts have been made by drone to connect; the nearest location of connectivity by a user device was at GPS location N, N using cellular; location N, N is within range of the user's other devices. | The drone flies to location N, N and attempts cellular connectivity, and operates in a relay mode. |

Figure 2:
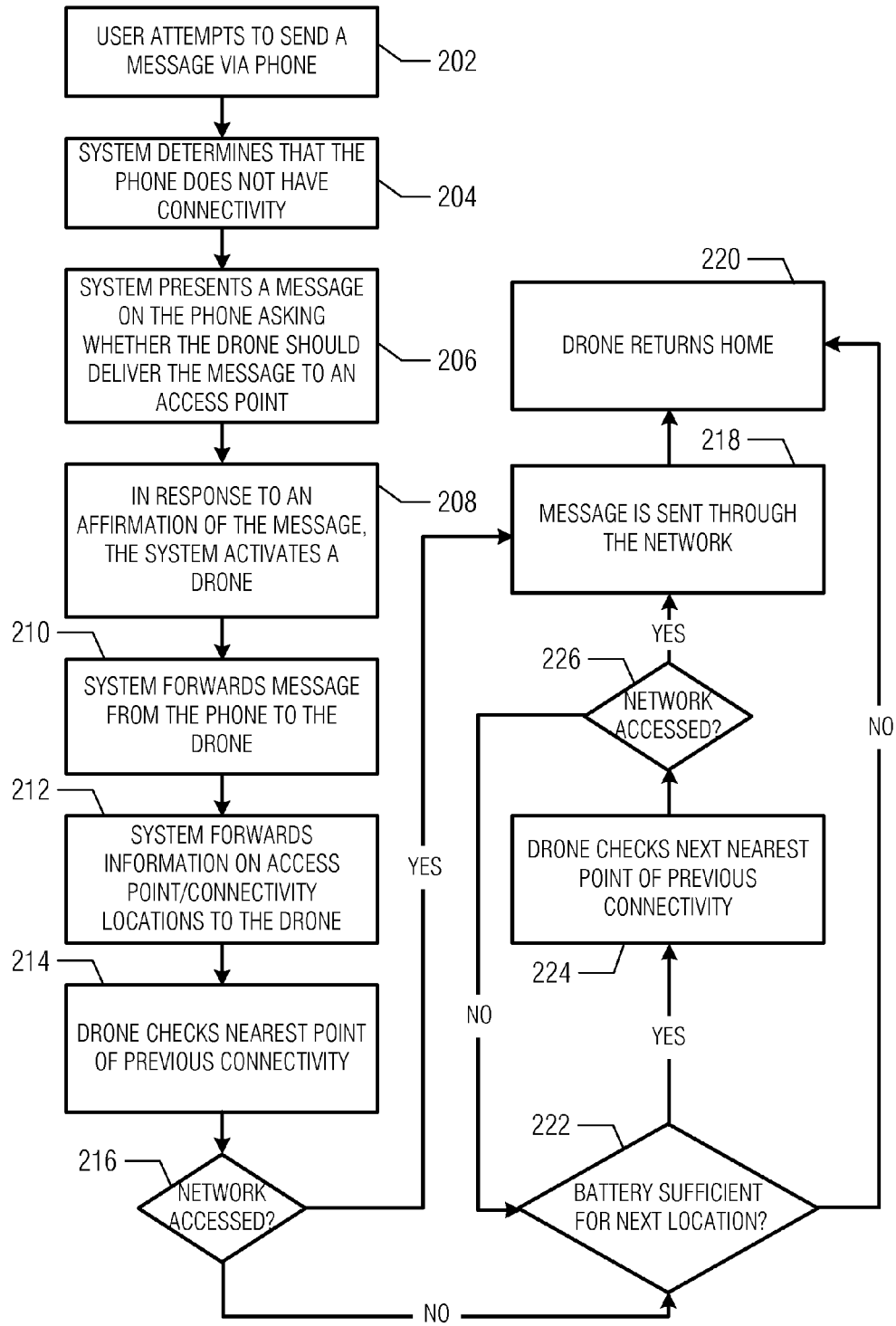
FIG. 2 is a flow chart illustrating a method to transmit a message via a drone in a forwarding mode of operation, according to various examples.

FIG. 2 is a flow chart illustrating a method to transmit a message via a drone in a forwarding mode of operation, according to an example embodiment. The method may be performed by any of the modules, logic, or components described herein. The method in FIG. 2 is described in the context of a phone being the user device 112, but other types of user devices may be used (e.g., laptops, tablets, wearables, etc.).

In an example, at operation 202 a user attempts to send a message via a phone. For example, the message may be an e-mail message or an SMS message. At operation 204, the system (e.g., the communication extension system 128) determines that the phone does not have connectivity. Then, at operation 206, the system may present a message on the phone asking whether a drone should deliver the message to an access point.

In an example, at operation 208, in response to an affirmation of the presented message, the system activates a drone. Activation may include transmitting a signal to the drone to change from a stand-by mode to an active mode. Upon activation, the system may transfer a set of data to the drone. For example, the data may include forwarding the message to the drone (operation 210) and information on access point/connectivity locations (operation 212). The connectivity data may include locations of access points and the last time a user device accessed the access point.

At operation 214, the drone may check the nearest point of previous connectivity. For example, the drone may access the drone's current GPS location and compare it to the locations of access points received at operation 212. The drone may then navigate to this location and determine if a network can be accessed at this location (operation 216). In an example, if the network was accessed (e.g., using a cell network or Wi-Fi access point), the message received at operation 210 may be transmitted through the network (operation 218) and then the drone returns home (operation 220).

In an example, if the network could not be accessed by the drone at the nearest point of connectivity, flow continues to decision point 222. At decision point 222 the drone may check if there is enough battery—or other energy source—to navigate to the next nearest location. If there is sufficient battery power, then, at operation 224, the drone may navigate to and check for network access at the next nearest point of connectivity and if the network is accessed (operation 226) the message is sent through the network (operation 218). If the network cannot be accessed, flow continues back to decision point 222. If there is insufficient battery power to navigate to another access point, the drone return home (operation 220).

FIG. 3 is a flow chart illustrating a method to receive media data from a drone in a batch mode of operation, according to an example embodiment. The method may be performed by any of the modules, logic, or components described herein.

In an example, at operation 302, media may be buffered on a user device and watched by the user (operation 304). Media may include but is not limited to video, audio, picture files, and slideshows. For example, a user may be watching a streaming video on his or her phone using a media player. In an example, at operation 306, the media player may detect a loss of connectivity. The loss of connectivity may be a complete loss of a connection or a degraded connection as measured by QoS metrics.

In an example, at operation 308, the media player may alert a drone coordination module of the lost connectivity and an estimated time of play interruption before the buffer is full. For example, the estimated time may be based on the current throughput of the network connection and the bitrate of the media being streamed.

At operation 310, the drone coordination module dispatches a drone associated with the user device to a location to retrieve the media. For example, the location may be based on the nearest point of connectivity that has network access with higher throughput than the network connection used by the media player. In an example, the drone navigates to the location and connects to a network to retrieve the media (operation 312). The loaded media may be a portion of the entire media. For example, if the user has already watched the first ten minutes of a thirty minute show, the loaded media may be the last twenty minutes. In an example, at operation 314, the drone returns back to the location of the media player and syncs the loaded media over a network. In various examples, DRM tokens are transmitted to the drone coordination module for retrieval of the media.

Figure 4:
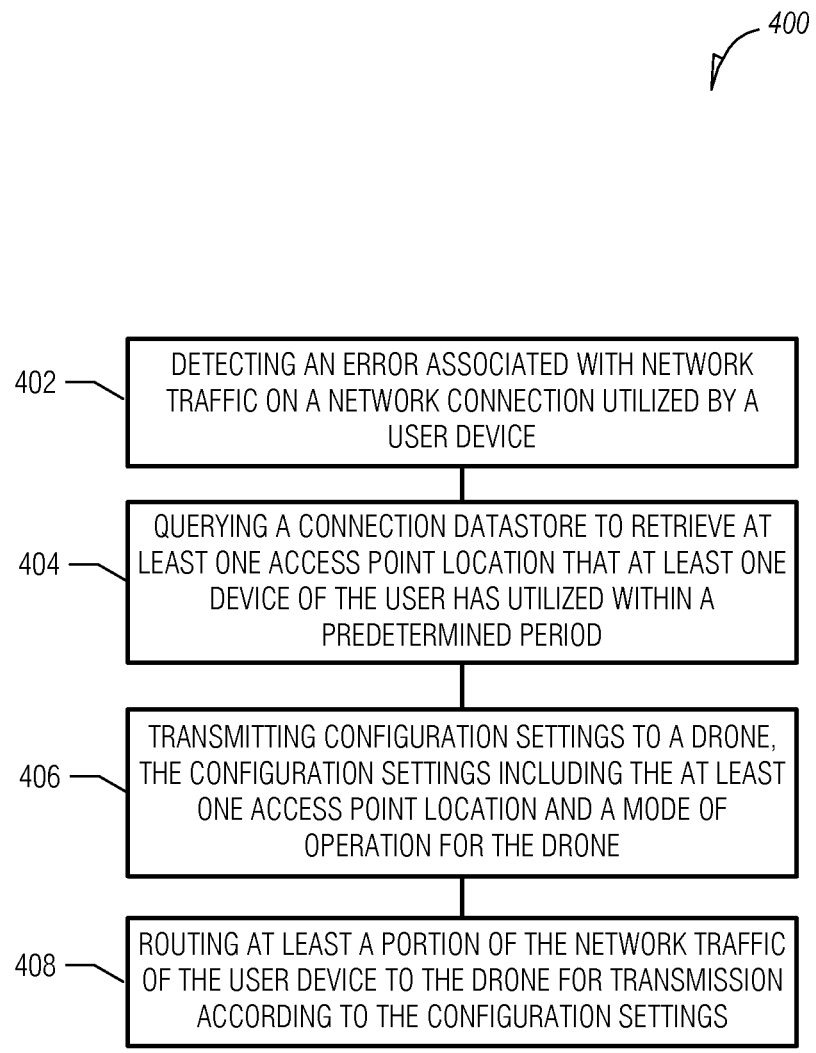
FIG. 4 is a flow chart illustrating a method to route network traffic to a drone, according to various examples.

FIG. 4 is a flow chart illustrating a method to route network traffic to a drone, according to various examples. The method may be performed by any of the modules, logic, or components described herein.

In an example, at operation 402, an error is detected associated with network traffic on a network connection utilized by a user device. For example, the throughput of the network traffic may be monitored for the error.

In an example, at operation 404, a connection datastore is queried to retrieve at least one access point location that at least one device of the user has utilized within a predetermined period. The connection datastore may be updated based on an access point connected to the user device. For example, when the user device connects to a network using an access point, an entry may be created in the datastore—or updated if the access point exists already. An access point may be a Wi-Fi access point or a cell tower.

In an example, at operation 406, configuration settings are transmitted to a drone that include the at least one access point location and a mode of operation for the drone. The configuration settings may include navigation parameters based on the battery life of the drone. For example, the parameters may indicate how the drone should operate if the battery life is below a certain threshold.

In various examples, the mode of operation may be based on the classification of the error. For example, the mode of operation may be a batch data gathering mode of operation when the classification indicates the network connection has insufficient bandwidth for a network activity (e.g. audio & video streaming, file transfer/backup, large email attachment download, etc.). In an example, the mode of operation is a forwarding mode when the classification indicates no network traffic is being transmitted on the network connection.

The mode of operation may be based on an access point location relative to a location of another user device. For example, if another user device currently has network access, the drone may operate in a relay mode in which the drone navigates from the user device to the another user device for transmission using the another user's device network connection.

In an example, at operation 408, at least a portion of the network traffic of the user device is routed to the drone for transmission according to the configuration settings. In various examples, an option is presented to a user to utilize the drone for the network traffic on the network connection when the error is detected. Before routing the network traffic, an indication is received that user has accepted the option. In an example, the drone may receive credentials when the network traffic indicates the user device is connected with the network service. In an example, a digital rights management token for a video may be transmitted to the drone when the network traffic indicates the video is attempting to be played over the network connection.

Example Computer System

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
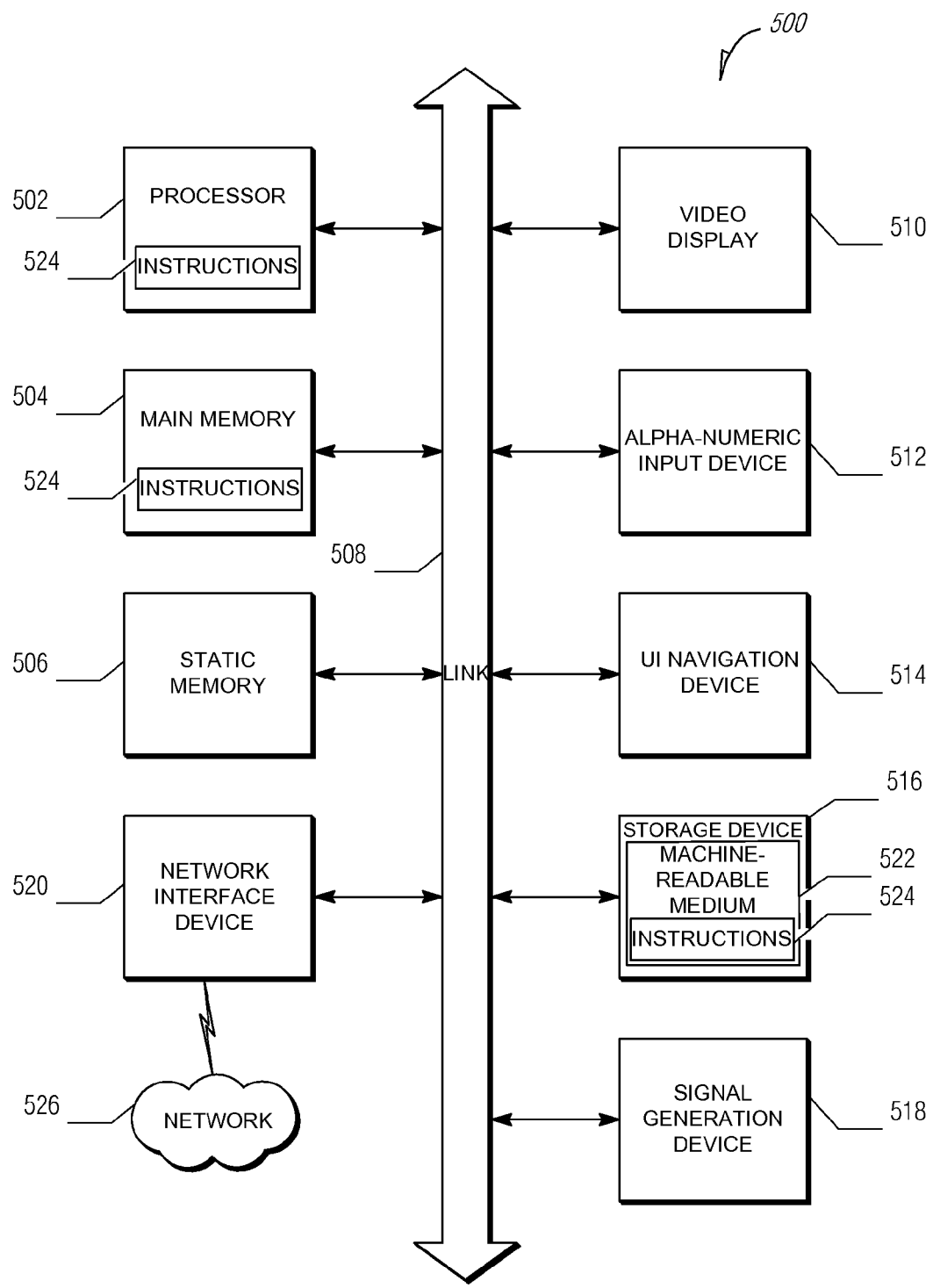
FIG. 5 is a block diagram of machine in the example form of a computer system within which a set instructions, for causing the machine to perform any one or more of the methodologies discussed herein, may be executed.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Example 1 includes subject matter (such as a device, apparatus, or machine) for using a drone for network connectivity, the subject matter comprising: a connectivity module to: detect an error associated with network traffic on a network connection utilized by a user device; and query a connection datastore to retrieve at least one access point location that at least one device of the user has utilized within a predetermined period; and a drone coordination module to: transmit configuration settings to a drone, the configuration settings including the at least one access point location and a mode of operation for the drone; and route at least a portion of the network traffic of the user device to the drone for transmission according to the configuration settings.

In Example 2, the subject matter of Example 1 may include, wherein to detect the error associated with network traffic, the connectivity module is to: monitor the throughput of the network traffic.

In Example 3, the subject matter of any one of Examples 1 to 2 may include, wherein the drone coordination module is to: present an option to a user to utilize the drone for the network traffic on the network connection; and receive an indication that the user has accepted the option before routing the at least a portion of the network traffic of the user device to the drone.

In Example 4, the subject matter of any one of Examples 1 to 3 may include, wherein the drone coordination module is to: determine the mode of operation based on a classification of the error.

In Example 5, the subject matter of any one of Examples 1 to 4 may include, wherein the mode of operation is a batch data gathering mode when the classification indicates the network connection has insufficient bandwidth for a network activity.

In Example 6, the subject matter of any one of Examples 1 to 5 may include, wherein the mode of operation is a forwarding mode when the classification indicates no network traffic is being transmitted on the network connection.

In Example 7, the subject matter of any one of Examples 1 to 6 may include, wherein the drone coordination module is to: determine the mode operation based on the at least one access point location relative to a location of another user device.

In Example 8, the subject matter of any one of Examples 1 to 7 may include, wherein the drone coordination module is to: store credentials of a network service utilized by the user; and transmit the credentials to the drone when the network traffic indicates the user device is connected with the network service.

In Example 9, the subject matter of any one of Examples 1 to 8 may include, wherein the drone coordination module is to: in response to a determination that the location of an access point is within connectivity range of another user device, set the mode of operation to a relay mode.

In Example 10, the subject matter of any one of Examples 1 to 9 may include, wherein the drone coordination module is to: transfer a digital rights management token for a video to the drone when the network traffic indicates the video is attempting to be played over the network connection.

In Example 11, the subject matter of any one of Examples 1 to 10 may include, wherein the configuration settings further include navigation parameters based on the battery life of the drone.

In Example 12, the subject matter of any one of Examples 1 to 11 may include, wherein the connectivity module is to: update the connection datastore based on an access point previously connected to by the user device.

In Example 13, the subject matter of any one of Examples 1 to 12 may include, wherein the access point is a Wi-Fi access point.

In Example 14, the subject matter of any one of Examples 1 to 13 may include, wherein the access point is a cellular tower.

In Example 15, the subject matter of any one of Examples 1 to 14 may include, wherein the at least at portion of the network traffic includes a request for a video download.

Example 16 includes subject matter (such as a method, means for performing acts, machine readable medium including instructions that when performed by a machine cause the machine to performs acts, or an apparatus to perform) for using a drone for network connectivity comprising: detecting an error associated with network traffic on a network connection utilized by a user device; querying a connection datastore to retrieve at least one access point location that at least one device of the user has utilized within a predetermined period; transmitting configuration settings to a drone, the configuration settings including the at least one access point location and a mode of operation for the drone; and routing at least a portion of the network traffic of the user device to the drone for transmission according to the configuration settings.

In Example 17, the subject matter of Example 16 may include, wherein detecting the error associated with network traffic comprises: monitoring the throughput of the network traffic.

In Example 18, the subject matter of any one of Examples 16 to 17 may include, presenting an option to a user to utilize the drone for the network traffic on the network connection; and receiving an indication that the user has accepted the option before routing the at least a portion of the network traffic of the user device to the drone.

In Example 19, the subject matter of any one of Examples 16 to 18 may include, determining the mode of operation based on a classification of the error.

In Example 20, the subject matter of any one of Examples 16 to 19 may include, wherein the mode of operation is a batch data gathering mode when the classification indicates the network connection has insufficient bandwidth for a network activity.

In Example 21, the subject matter of any one of Examples 16 to 20 may include, wherein the mode of operation is a forwarding mode when the classification indicates no network traffic is being transmitted on the network connection.

In Example 22, the subject matter of any one of Examples 16 to 21 may include, determining the mode operation based on the at least one access point location relative to a location of another user device.

In Example 23, the subject matter of any one of Examples 16 to 22 may include, storing credentials of a network service utilized by the user; and transmitting the credentials to the drone when the network traffic indicates the user device is connected with the network service.

In Example 24, the subject matter of any one of Examples 16 to 23 may include, in response to determining that the location of an access point is within connectivity range of another user device, setting the mode of operation to a relay mode.

In Example 25, the subject matter of any one of Examples 16 to 24 may include, transferring a digital rights management token for a video to the drone when the network traffic indicates the video is attempting to be played over the network connection.

In Example 26, the subject matter of any one of Examples 16 to 25 may include, wherein the configuration settings further include navigation parameters based on the battery life of the drone.

In Example 27, the subject matter of any one of Examples 16 to 26 may include, updating the connection datastore based on an access point previously connected to by the user device.

In Example 28, the subject matter of any one of Examples 16 to 27 may include, wherein the access point is a Wi-Fi access point.

In Example 29, the subject matter of any one of Examples 16 to 28 may include, wherein the access point is a cellular tower.

In Example 30, the subject matter of any one of Examples 16 to 29 may include, wherein the at least at portion of the network traffic includes a request for a video download.

Example 31 includes at least one machine-readable medium including instructions, which when executed by a machine, cause the machine to perform operations of any of the Examples 16-30.

Example 32 includes an apparatus comprising means for performing any of the Examples 16-30.

Example 33 includes subject matter (such as a device, apparatus, or machine) for using a drone for network connectivity comprising: means for detecting an error associated with network traffic on a network connection utilized by a user device; means for querying a connection datastore to retrieve at least one access point location that at least one device of the user has utilized within a predetermined period; means for transmitting configuration settings to a drone, the configuration settings including the at least one access point location and a mode of operation for the drone; and means for routing at least a portion of the network traffic of the user device to the drone for transmission according to the configuration settings.

In Example 34, the subject matter of Example 33 may include, wherein the means for detecting the error associated with network traffic comprise: means for monitoring the throughput of the network traffic.

In Example 35, the subject matter of any one of Examples 33 to 34 may include, means for presenting an option to a user to utilize the drone for the network traffic on the network connection; and means for receiving an indication that the user has accepted the option before routing the at least a portion of the network traffic of the user device to the drone.

In Example 36, the subject matter of any one of Examples 33 to 35 may include, means for determining the mode of operation based on a classification of the error.

In Example 37, the subject matter of any one of Examples 33 to 36 may include, wherein the mode of operation is a batch data gathering mode when the classification indicates the network connection has insufficient bandwidth for a network activity.

In Example 38, the subject matter of any one of Examples 33 to 37 may include, wherein the mode of operation is a forwarding mode when the classification indicates no network traffic is being transmitted on the network connection.

In Example 39, the subject matter of any one of Examples 33 to 38 may include, means for determining the mode operation based on the at least one access point location relative to a location of another user device.

In Example 40, the subject matter of any one of Examples 33 to 39 may include, means for storing credentials of a network service utilized by the user; and means for transmitting the credentials to the drone when the network traffic indicates the user device is connected with the network service.

In Example 41, the subject matter of any one of Examples 33 to 40 may include, in response to determining that the location of an access point is within connectivity range of another user device, means for setting the mode of operation to a relay mode.

In Example 42, the subject matter of any one of Examples 33 to 41 may include, means for transferring a digital rights management token for a video to the drone when the network traffic indicates the video is attempting to be played over the network connection.

In Example 43, the subject matter of any one of Examples 33 to 42 may include, wherein the configuration settings further include navigation parameters based on the battery life of the drone.

In Example 44, the subject matter of any one of Examples 33 to 43 may include, means for updating the connection datastore based on an access point previously connected to by the user device.

In Example 45, the subject matter of any one of Examples 33 to 44 may include, wherein the access point is a Wi-Fi access point.

In Example 46, the subject matter of any one of Examples 33 to 45 may include, wherein the access point is a cellular tower.

In Example 47, the subject matter of any one of Examples 33 to 46 may include, wherein the at least at portion of the network traffic includes a request for a video download.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system of using a drone for network connectivity, the system comprising:
    a connectivity module to:
        detect an error associated with network traffic on a network connection utilized by a user device;
        query a connection datastore to retrieve at least one access point location that at least one device of the user has utilized within a predetermined period;
    a drone coordination module to:
        transmit configuration settings to a drone, the configuration settings including the at least one access point location and a mode of operation for the drone; and
        route at least a portion of the network traffic of the user device to the drone for transmission according to the configuration settings.

2. The system of claim 1, wherein to detect the error associated with network traffic, the connectivity module is to:
    monitor the throughput of the network traffic.

3. The system of claim 1, wherein the drone coordination module is to:
    present an option to a user to utilize the drone for the network traffic on the network connection; and
    receive an indication that the user has accepted the option before routing the at least a portion of the network traffic of the user device to the drone.

4. The system of claim 1, wherein the drone coordination module is to:
    determine the mode of operation based on a classification of the error.

5. The system of claim 4, wherein the mode of operation is a batch data gathering mode when the classification indicates the network connection has insufficient bandwidth for a network activity.

6. The system of claim 4, wherein the mode of operation is a forwarding mode when the classification indicates no network traffic is being transmitted on the network connection.

7. The system of claim 1, wherein the drone coordination module is to:
    determine the mode operation based on the at least one access point location relative to a location of another user device.

8. The system of claim 1, wherein the drone coordination module is to:
    store credentials of a network service utilized by the user; and
    transmit the credentials to the drone when the network traffic indicates the user device is connected with the network service.

9. The system of claim 1 wherein the drone coordination module is to:

in response to a determination that the location of an access point is within connectivity range of another user device, set the mode of operation to a relay mode.

10. The system of claim 1, wherein the drone coordination module is to:
transfer a digital rights management token for a video to the drone when the network traffic indicates the video is attempting to be played over the network connection.

11. A method of using a drone for network connectivity, the method comprising:
detecting an error associated with network traffic on a network connection utilized by a user device;
querying a connection datastore to retrieve at least one access point location that at least one device of the user has utilized within a predetermined period;
transmitting configuration settings to a drone, the configuration settings including the at least one access point location and a mode of operation for the drone; and
routing at least a portion of the network traffic of the user device to the drone for transmission according to the configuration settings.

12. The method of claim 11, wherein detecting the error associated with network traffic comprises:
monitoring the throughput of the network traffic.

13. The method of claim 11, further comprising:
presenting an option to a user to utilize the drone for the network traffic on the network connection; and
receiving an indication that the user has accepted the option before routing the at least a portion of the network traffic of the user device to the drone.

14. The method of claim 11, further comprising:
determining the mode of operation based on a classification of the error.

15. The method of claim 14, wherein the mode of operation is a batch data gathering mode when the classification indicates the network connection has insufficient bandwidth for a network activity.

16. The method of claim 14, wherein the mode of operation is a forwarding mode when the classification indicates no network traffic is being transmitted on the network connection.

17. The method of claim 11, further comprising:
determining the mode operation based on the at least one access point location relative to a location of another user device.

18. The method of claim 11, further comprising:
storing credentials of a network service utilized by the user; and
transmitting the credentials to the drone when the network traffic indicates the user device is connected with the network service.

19. The method of claim 11, further comprising:
in response to determining that the location of an access point is within connectivity range of another user device, setting the mode of operation to a relay mode.

20. The method of claim 11, further comprising:
transferring a digital rights management token for a video to the drone when the network traffic indicates the video is attempting to be played over the network connection.

21. At least one machine-readable medium including instructions, which when executed by a machine, cause the machine to perform operations comprising:
detecting an error associated with network traffic on a network connection utilized by a user device;
querying a connection datastore to retrieve at least one access point location that at least one device of the user has utilized within a predetermined period;
transmitting configuration settings to a drone, the configuration settings including the at least one access point location and a mode of operation for the drone; and
routing at least a portion of the network traffic of the user device to the drone for transmission according to the configuration settings.

22. The least one machine-readable medium of claim 21, wherein the operation of detecting the error associated with network traffic comprises:
monitoring the throughput of the network traffic.

23. The least one machine-readable medium of claim 21, the operations further comprising:
presenting an option to a user to utilize the drone for the network traffic on the network connection; and
receiving an indication that the user has accepted the option before routing the at least a portion of the network traffic of the user device to the drone.

24. The least one machine-readable medium of claim 21, the operations further comprising:
determining the mode of operation based on a classification of the error.

25. The least one machine-readable medium of claim 24, wherein the mode of operation is a batch data gathering mode when the classification indicates the network connection has insufficient bandwidth for a network activity.

* * * * *